(12) United States Patent
Olson

(10) Patent No.: US 8,308,142 B1
(45) Date of Patent: Nov. 13, 2012

(54) SYSTEM AND METHOD FOR TRANSPORTING CARGO UTILIZING AN AIR TOWING SYSTEM THAT CAN ACHIEVE VERTICAL TAKE-OFF AND VERTICAL LANDING

(76) Inventor: Gaylord Olson, Princeton, NJ (US)

(*) Notice: Subject to any disclaimer, the term of this patent is extended or adjusted under 35 U.S.C. 154(b) by 379 days.

(21) Appl. No.: 12/822,025

(22) Filed: Jun. 23, 2010

(51) Int. Cl.
*B64D 1/22* (2006.01)
*B64C 37/02* (2006.01)
*B64D 1/08* (2006.01)

(52) U.S. Cl. ............................ 258/1.4; 244/2; 244/137.1

(58) Field of Classification Search ............... 244/2, 63, 244/136, 137.1, 137.4; 258/1.2, 1.4; 294/904
See application file for complete search history.

(56) References Cited

U.S. PATENT DOCUMENTS

| | | | | |
|---|---|---|---|---|
| 1,181,784 A * | 5/1916 | McCurry | .................... | 244/17.19 |
| 2,295,537 A * | 9/1942 | Anderson | ...................... | 258/1.4 |
| 2,298,912 A * | 10/1942 | Alabrune | ........................ | 258/1.4 |
| 2,373,086 A * | 4/1945 | Alabrune | ........................ | 258/1.4 |
| 2,721,044 A * | 10/1955 | Young | ............................... | 244/2 |
| 2,730,398 A * | 1/1956 | Huested | ........................ | 294/81.1 |
| 3,226,056 A * | 12/1965 | Holland, Jr. | ........................ | 244/2 |
| 4,416,436 A * | 11/1983 | Wilson, Jr. | .................. | 244/137.1 |
| 5,088,663 A * | 2/1992 | Henson | ........................ | 244/137.1 |
| 5,626,310 A * | 5/1997 | Kelly | ................................. | 244/2 |
| 5,722,618 A * | 3/1998 | Jacobs et al. | ............... | 244/137.1 |
| 8,191,818 B2 * | 6/2012 | Larkin | ......................... | 244/1 TD |

OTHER PUBLICATIONS

Paul Williams et al., "Dynamics of Towed Payload System Using Multiple Fixed-Wing Aircraft", Journal of Guidance, Control, and Dynamics vol. 32, No. 6, Nov.-Dec. 2009, p. 1766.
Francis M. Wilson, Jr., "New Concept for Low Cost VTOL Cargo Delivery Capability", American Institute of Aeronautics and Astronautics, Inc., 1983, 83-2207.

* cited by examiner

*Primary Examiner* — Joseph W Sanderson
(74) *Attorney, Agent, or Firm* — LaMorte & Associates P.C.

(57) ABSTRACT

A system and method of lifting a cargo container into flight using a plurality of aircraft. A swivel bearing is provided that has a first end and a second end. The two ends of the swivel bearing are free to rotate independently. A cargo container is provided that is streamlined for flight. The second end of the swivel bearing is attached to the cargo container. Aircraft in flight are used to lift the container. The aircraft have tow tether lines. The tow tether lines are attached to the first end of the swivel bearing. The aircraft fly in an ascending circular pattern, therein applying lift to the cargo container that is sufficient to raise the cargo container into flight. The cargo container is streamlined and contains flight controls to enable the cargo container to maintain level and controlled flight while it is being towed.

15 Claims, 5 Drawing Sheets

SYSTEM AND METHOD FOR TRANSPORTING CARGO UTILIZING AN AIR TOWING SYSTEM THAT CAN ACHIEVE VERTICAL TAKE-OFF AND VERTICAL LANDING

BACKGROUND OF THE INVENTION

1. Field of the Invention

In general, the present invention relates to cargo containers that are towed in flight by one or more aircraft. More particularly, the present invention relates to the structure of the cargo container and the methodology used to lift and tow the cargo container.

2. Prior Art Description

With recent progress in precision autopilots, remote controlled aircraft, inertial measurement sensors, and high strength tether line materials, a new form of quiet and cost-effective airborne transportation is achievable. The present invention system allows for a slow, vertical transfer of any type of cargo with a later transition to high speed horizontal flight. The general approach is an extension of the concepts in U.S. Pat. Nos. 2,298,912, 2,373,086, 4,416,436, and 5,722,618. The mode of operation and some hardware elements would be different from those shown previously. The oldest three patents above assume that the payload being transported is able to withstand wind gusts near the ground while ascending, descending, and landing. For a passive, rectangular container such as shown in U.S. Pat. No. 4,416,436, this might lead to a bumpy landing with danger to people and/or ground objects. Also, for all concepts shown in the patents above, the cargo will be rotating about a vertical axis while ascending, descending, and at the time of landing. These disadvantages might be overcome with the use of the present invention as described and claimed below.

SUMMARY OF THE INVENTION

The present invention is a system and method of lifting a cargo container into flight using a plurality of aircraft. In accordance with the present invention, a swivel bearing is provided that has a first end and a second end. The two ends of the swivel bearing are free to rotate independently. A cargo container is provided that is streamlined and otherwise specially adapted for flight. The second end of the swivel bearing is attached to the cargo container.

Aircraft in flight are used to lift the container. The aircraft have tow tether lines. The tow tether lines are attached to the first end of the swivel bearing. The aircraft fly in an ascending circular pattern, therein applying lift to the cargo container that is sufficient to raise the cargo container into flight. The cargo container is streamlined and contains flight controls to enable the cargo container to maintain level and controlled flight while it is being towed.

DESCRIPTION OF THE DRAWINGS

Figure 1:
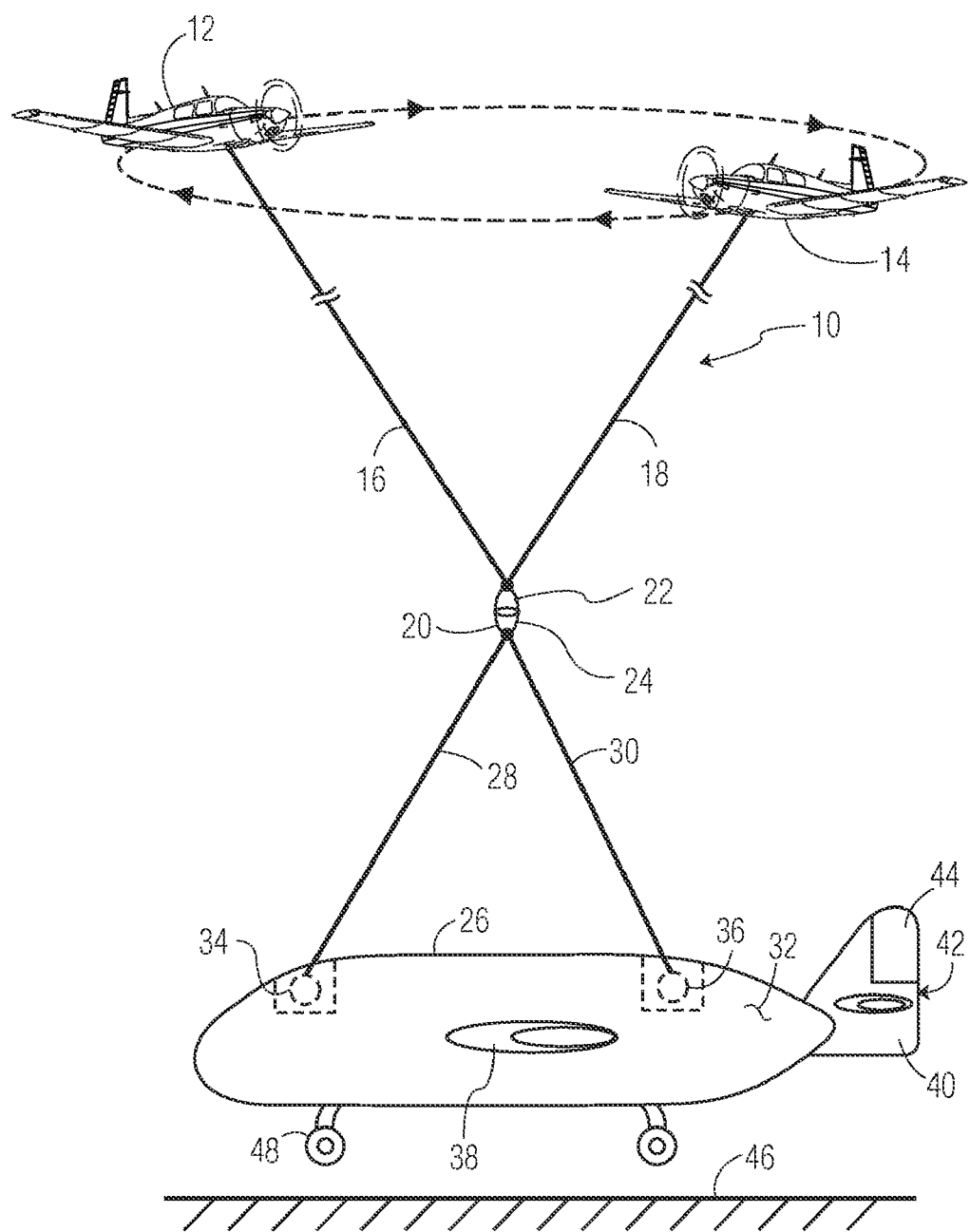
FIG. 1 is a schematic of an exemplary embodiment of the overall system.
Figure 2:
FIG. 2 is a side view of an exemplary cargo container in flight.
Figure 3:
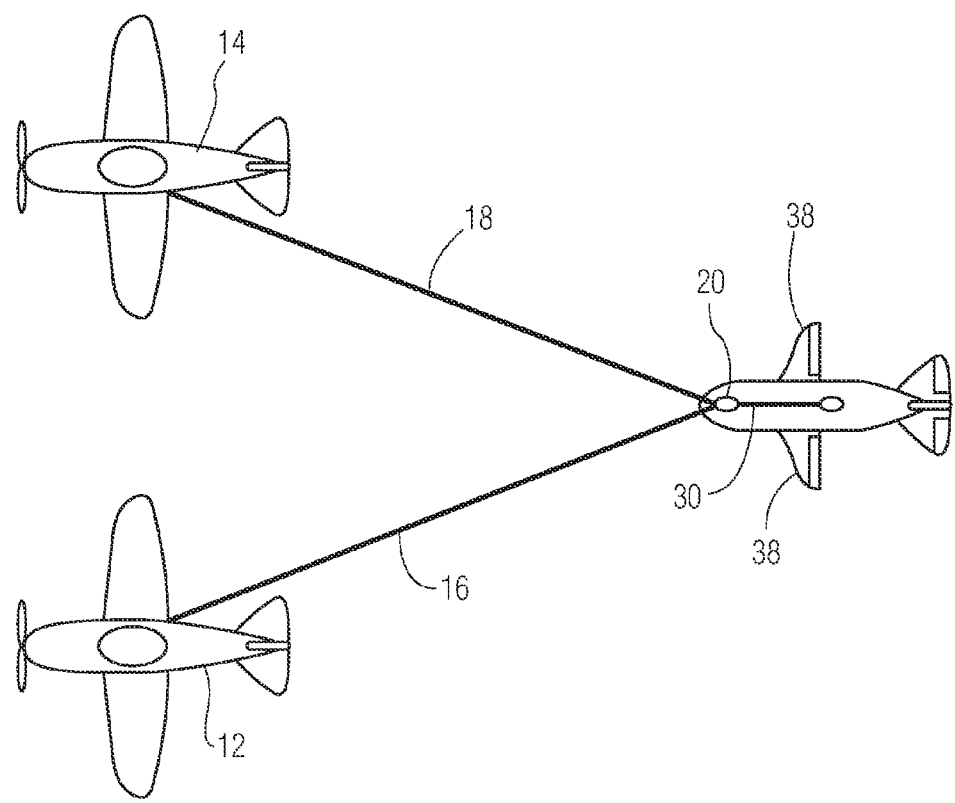
FIG. 3 is a top view of the embodiment of FIG. 2.

FIG. 1 shows a system 10 with two tether lines 16 and 18 which would be attached to two tow planes 12 and 14 similar to the patents referenced above. In this case, however, the cargo container 26 has a highly streamlined fuselage 32, and the swivel bearing 20 together with the tail section 40 and vertical stabilizer 42 will keep the container pointed into the relative wind at all times. This will reduce the effects of wind gusts on the system. The top portion of the swivel bearing 22 will rotate in synchronism with the circular flight of the tow planes. The bottom section 24 of the swivel bearing will be oriented in the same direction as the cargo container 26. Also indicated in FIG. 1 is an optional mini-wing 38 (one for each side). The mini-wings 38 will provide lift and control during high speed travel as shown in FIGS. 2 and 3. As indicated in FIG. 3, the tow planes have wings large enough for conventional take-offs and landings. The mini-wings on the cargo container, however, only need to be large enough to support the maximum cargo weight at cruising speed. In the absence of these mini-wings, the tow planes would need to travel slower and use more fuel to compensate for the force of gravity from the cargo. The principal reason to keep the wings 38 small is to reduce the drag force in the system and thus allow for higher speed and lower fuel usage.

The tow planes 12, 14 have high speed, high power winches (not shown) to control each of the tether lines 16 and 18. During slow, vertical travel of the cargo container, these lines might be 1000 to 2000 feet long. During high speed travel (FIGS. 2 and 3) they would be shortened so that their drag would be much smaller than the drag of the cargo container.

Also to be noted in FIGS. 2 and 3 is the fact that the cargo container is being towed from its nose (similar to a towed glider). This configuration is achieved by control of the two high-speed winches 34 and 36 in FIG. 1. During slow speed vertical travel these winches will give control of the pitch angle of the container. During transition to high-speed horizontal flight, the line 28 from winch 34 in FIG. 1 would be shortened to nearly zero length. The line 30 from winch 36 would be adjusted to have no slack but perhaps a small amount of tension. The goal is to have the force from the tow planes coming to the cargo container primarily through winch 34.

Although winches 34 and 35 are illustrated, it will be understood that any other mechanism capable of selectively lengthening and/or shortening the tether lines can be used in place of the winches.

As indicated in FIG. 1, there will be some type of landing gear 48 to allow for irregular terrain 46 and less shock upon landing. The landing gear might be retractable for lower drag during high-speed flight. Alternatively, two parallel side rails or skids (as seen on small helicopters) might be used. Similarly, conventional wheels and tires 48 (as seen on many large helicopters) might be used.

Assuming the use of four wheels for support, the front wheels could be designed for steering, perhaps with a steering wheel. There could also be a propulsion unit to power the wheels (either two wheels or all four). Then, with at least a front windshield, the craft would be suitable for both ground and air travel. Since the wings 38 are a detriment for ground travel, they might be either designed to be foldable or not used at all. For low speed, short distance air travel, it might be easier to adapt an existing ground transportation vehicle with a winch assembly suitable for VTOL use rather than design a new vehicle from scratch.

If the two winches 34 and 36 in FIG. 1 have sufficient speed and power, they can be used to help control the vertical velocity of the cargo container at the time of landing. For example, using an altimeter in the container (and/or other sensor types) the vertical velocity can be accurately known just prior to landing. If the downward velocity is too high prior to touch-down, the winches 34 and 36 can be used to give an upwards component of acceleration and velocity so that the touch-down impact velocity is in a tolerable range. If the cargo container 26 has a nearly zero velocity prior to touch-down, the two winches 34 and 36 can extend their lines 28 and 30 until touch-down is achieved. Another way to control orientation, X-Y position, and vertical velocity of the cargo container is indicated by elements in FIG. 4. This top view shows control surfaces 50 and 52 similar to aileron and elevator surfaces on conventional aircraft. We will assume that these surfaces are all individually adjustable, so they can control the roll orientation and also the vertical force (positive or negative) from the wind.

Figure 4:
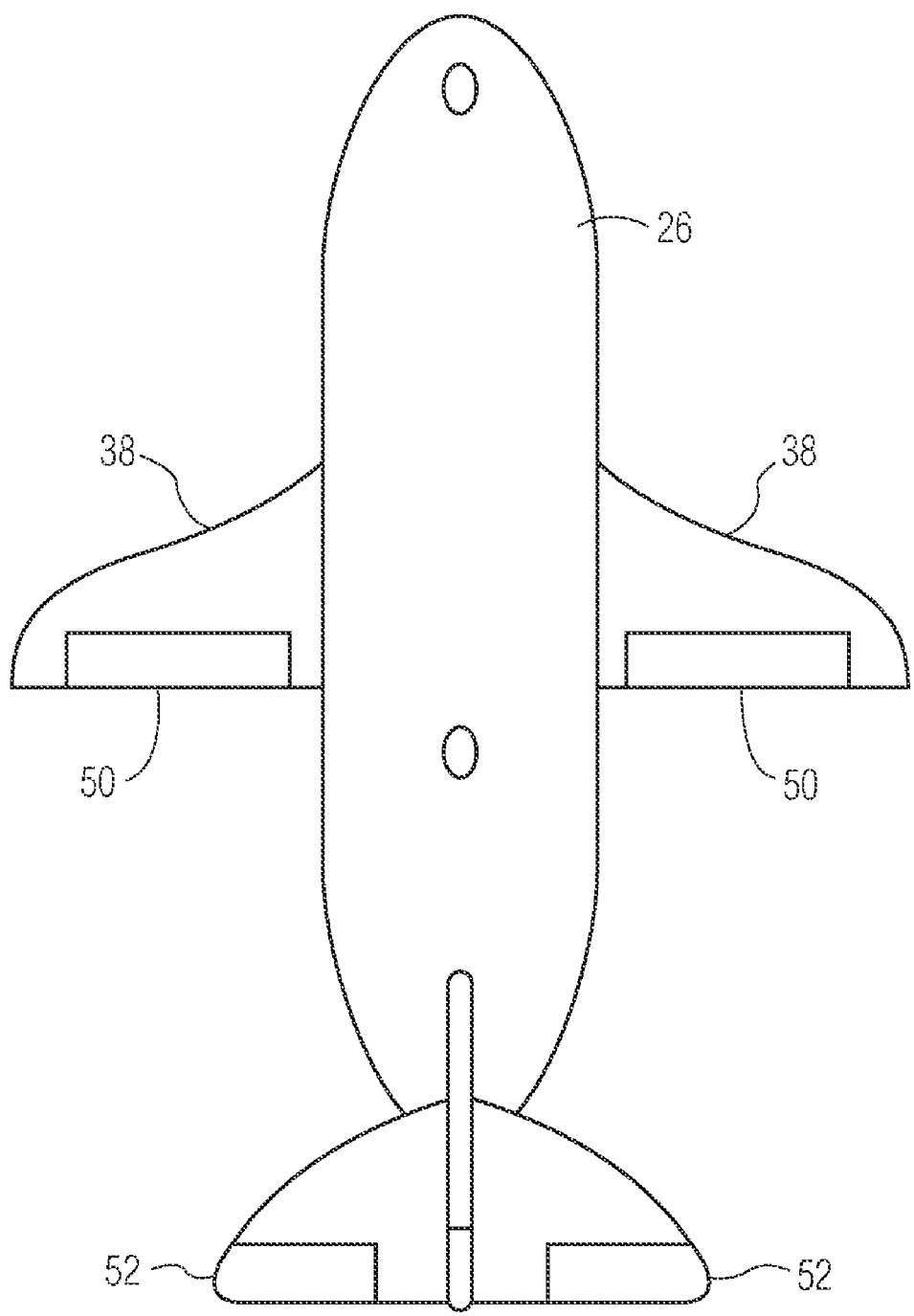
FIG. 4 is a top view of an exemplary cargo container.

The control surfaces in FIG. 4 together with the rudder in FIG. 1 will also provide fine control of X-Y (horizontal) position of the cargo container just prior to touch-down. In order to control drag, the surfaces 50 in FIG. 4 might be lowered and the surfaces 52 might be raised. The opposite directions could also be used. This control of drag will provide some adjustment of horizontal position in the wind vector direction. Use of the rudder 44 in FIG. 1 and the ailerons 50 in FIG. 4 will give control of horizontal position perpendicular to the wind. This control is analogous to a human being flying a 4-line stunt kite except that in this case the kite is flying upside down. If we desire an upwards force on the cargo container, the surfaces in FIG. 4 would be lowered. If we desire a downwards force, the surfaces would be raised. The control as just described will not function in the absence of wind, however in this case the inertia of the cargo container may allow for a safe and secure touch-down. For the case of high speed horizontal flight, the five control surfaces will give control similar to that of a towed glider. In this way the cargo container might be positioned either above or below the wake from the tow planes.

With recent advances in sensor technology, we might assume that there will be real-time data on X, Y, Z position and roll, pitch, and yaw orientation of all three airborne vehicles. We will also assume that there is radio telemetry communication between all vehicles. Thus, the data from the cargo container can be transmitted to each of the tow planes so that the velocity, the orbit path, and the tether line length can be adjusted. For example, a steady wind will give rise to a sinusoidal modulation of the cargo X-Y position with a period half that of the orbit cycle period. This modulation might be compensated for with adjustment of tow plane velocity or tow plane flight path. The tow plane related adjustments will provide at least a coarse position control. It should be noted that another way to minimize position modulation due to wind force on the cargo container is to use three tow planes rather than two. This will also increase the lifting capacity by 50 percent.

In the case of high winds with gusty conditions it may be desirable to have a sheltered zone for landing. For example, a clearing surrounded by large trees or a vacant lot surrounded by large buildings would be beneficial. In this regard, it may be better to have a Y-shaped tether arrangement as in FIG. 1 of U.S. Pat. No. 2,298,912 rather than the V shaped arrangement of FIG. 4 in U.S. Pat. No. 4,416,436. This will allow the inertia of the cargo container to be more isolated from wind gust variations incident on the tow planes. It will also allow for a smaller diameter clear zone for the landing area.

Figure 5:
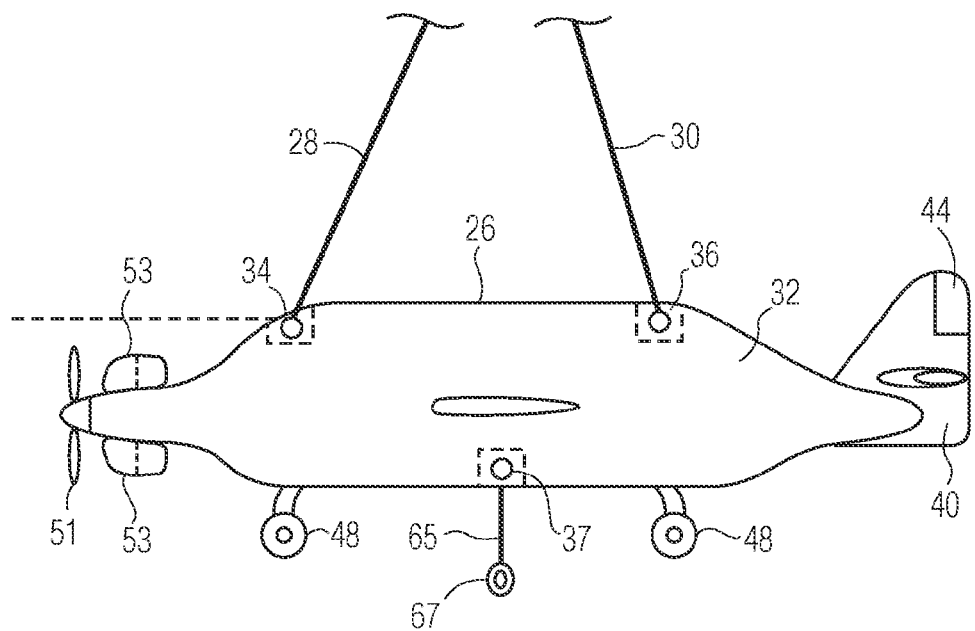
FIG. 5 is a side view of an alternate embodiment of a cargo container.
Figure 6:
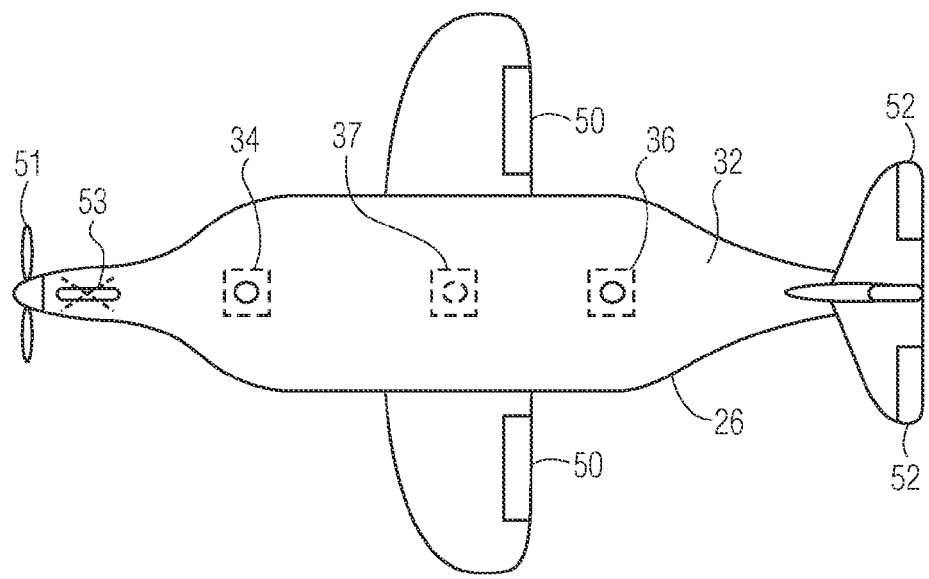
FIG. 6 is a top view of the embodiment of FIG. 5.

If we consider the case in which there is motion of the cargo container due to wind gusts at the tow plane altitude but very little wind at ground level, we might need a more active form of stabilization of the cargo container. This could be done as indicated in FIGS. 5 and 6 by using a small propeller 51 at the nose of the cargo container perhaps powered by an electric motor, along with one or two thrust deflectors 53 to give a variable force perpendicular to the propeller shaft. With a variable speed and/or a variable pitch, this propeller 51 could counteract forces due to both wind and tether line motion during the landing process. The thrust deflectors 53 could be simply circular or oval shaped fins which have a controlled deflection about a vertical central axis. These deflectors would be used to push the nose of the craft to the left or to the right. Together, the propeller and thrust deflector (or deflectors) would keep the nose of the cargo container over some fixed point on the ground during landing. With sufficient airflow over a large rudder, the rudder 44 might also be used to change the direction of thrust. This might be sufficient control so that the added thrust deflectors 53 could be avoided. Assuming the use of a two-bladed propeller, it could be locked in a feathered, horizontal position during high speed flight, so as not to interfere with the tether lines 28 and 30. We could also consider the use of flexible propeller blades such as those used on some model sailplanes. This would give a lower drag during high speed flight.

A simpler form of stabilization aid when landing would be the use of one or more tether lines which extend down from the bottom of the cargo container. This method would be very similar to what is now used for assisting the landing of blimps and airships. With a manned blimp, there are usually two tether lines attached to the nose of the craft. When these lines are at ground level prior to landing, groups of people on the ground pull on the lines. Using visual feedback, the pulling is adjusted to stop the horizontal movement of the craft. This allows for a very gentle touchdown. A similar result could be achieved with the VTOL craft described herein. A case could be made for one, two, or three tether lines. To avoid the need for a ground crew, robotically controlled winches could be used to exert the optimum pull on each of the lines just prior to landing. There would still be a need for at least one person on the ground to attach the bottom end of the tether line (or lines) to the winch (or winches). A specific form of this is indicated by elements shown in FIGS. 5 and 7.

Figure 7:
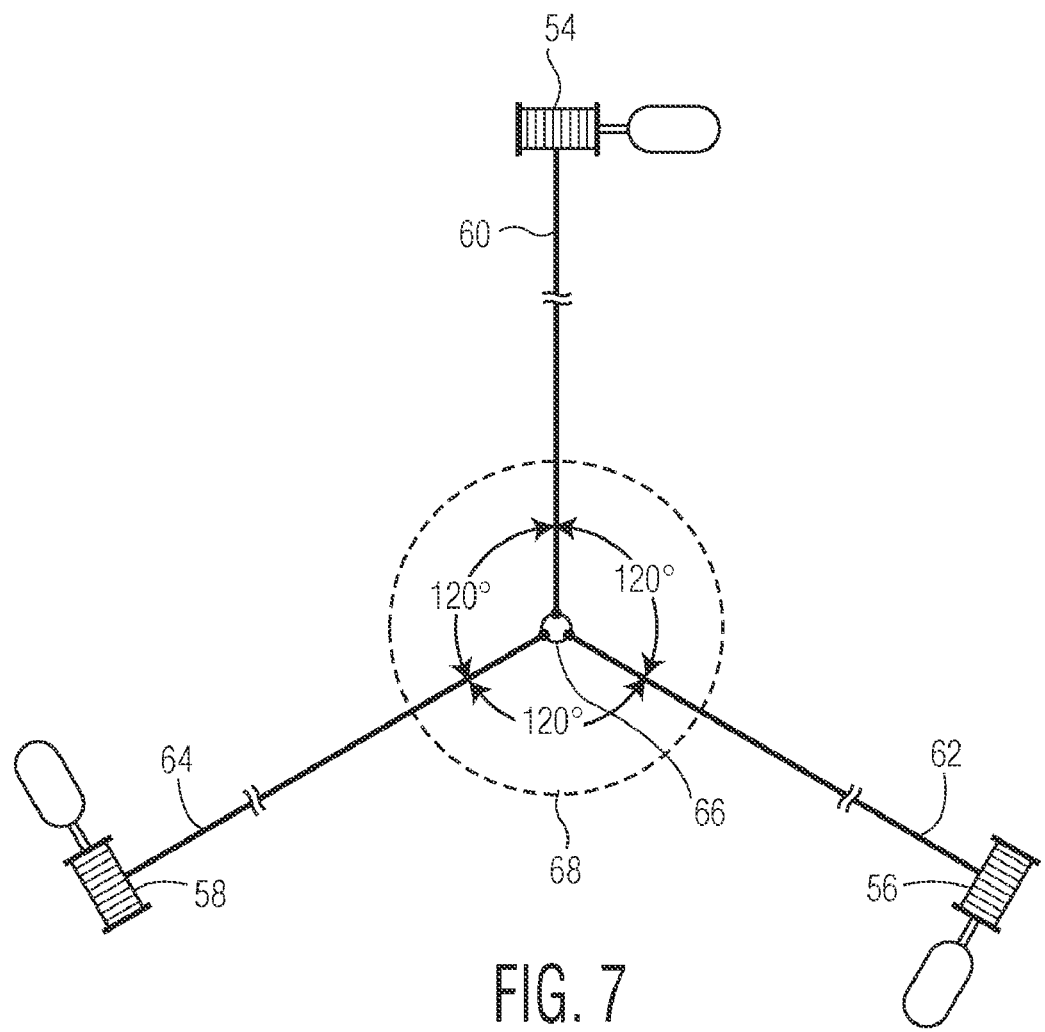
FIG. 7 is a schematic of an exemplary embodiment of a landing anchor apparatus

FIG. 5 shows another winch module 37 at the bottom center of the cargo container 26. This winch 37 controls a line 65 which has an attachment device 67 such as a spring clip at its bottom end. This winch/line/clip assembly would be used with the ground-based elements of FIG. 7. FIG. 7 shows three motorized winches 54, 56, and 58, which control the tension and lengths of three lines 60, 62, and 64 which are connected together at a central point. These three winches are used for landing stabilization, and could be controlled either by a computer or by a human operator. During landing, the airborne bottom winch line 65 would be extended far enough to reach the ground. Someone on the ground would then attach the bottom end of the cable 65 to the central tie point of the cables 60, 62, and 64. This might be easily done using a steel ring 66 (or other similar device) which has the three ground based lines attached. With all four lines connected, the airborne winch line 65 would be fully retracted (and the ground lines extended) so that the three lines from the ground are now effectively attached to the bottom center of the airborne cargo container. As the landing proceeds, the three ground winches can pull the craft gradually to the center of the desired landing zone 68 even in the presence of moderate wind gusts.

Another possibility to allow for safe touch-downs is to design the cargo container for flotation in water, so that high velocity contact with a solid surface is avoided. A fairly small diameter, shallow body of water should be suitable for this purpose. The design might also be amphibious, with retractable wheels along with a floatation structure.

We assume that both tow planes will have autopilot control with computer updating of desired heading and velocity. The computer hardware for this might be in the tow planes, in the cargo container, or at a ground station. For safety reasons there might be redundant capability at several locations. In addition to the autopilot control, we might assume that there will also be human pilots as part of the system. If there are no passengers in the cargo container, there may be no need for a pilot there, however if there are passengers, they may feel more secure if there is a pilot on board with them. It is possible that in the future this system could function without any airborne human pilots.

Safety for this system could be enhanced with the use of emergency parachutes at the top of each airborne vehicle. These are becoming commonplace on small propeller airplanes and are being developed for use on some 5000 pound multi-passenger jets as well. To enable this use, there may need to be an emergency release or detachment of tether lines, so as not to interfere with the parachute deployment.

The system as described above with two or three tow planes is perhaps not optimum for long distance travel. For travel distances of hundreds of miles it may be more efficient to use a single tow plane for the high speed portion of the flight. A radio controlled latch could be used to disconnect one of the tether lines (and its associated tow plane) from the swivel bearing in FIG. 1. This would be done just after the start of horizontal travel, and would be preceded by a transfer of tow force to the long distance tow plane. At the destination end of travel there would be a need for a tow plane to reconnect to the system. This might be done with a simple grappling hook or perhaps a more sophisticated system that is yet to be designed. Another option would be to use a propulsion unit (propeller or jet) on the passenger aircraft, in which case it would only be used during the high speed, horizontal portion of the travel. This would require a pair of tow planes to be used at both ends of travel.

The system as described above would have several advantages that might not be readily apparent. For example, with the propulsion unit (or units) always located at least several hundred feet away from the passengers, the environment would likely be quieter than any other passenger aircraft. For another step in this direction, the tow planes might use electric propulsion which is now being rapidly developed. This would result in nearly silent flight.

Another advantage for this system is the fact that during lift off and landing, the tether line force on the tow planes has a vector component which is pointed in the direction of the center of the orbit path. This is opposite to the centrifugal force due to the mass of the planes. If these forces are nearly equal, the planes can fly without any bank angle, in which case the vertical lift force from the wings might be higher than what is possible during normal take-off from an airport.

Suppose we desire the tow planes to have level wings (zero bank angle) in their circle pattern (as mentioned above). In this case, the parameter relationship equation may be written as:

$$2mH(V)^2 = F(R)^2$$

where m=mass of each tow plane
H=vertical distance from the tow planes to the point where the tow lines are joined together
V=tow plane velocity
F=force from the weight of the cargo
R=radius of the circle One more advantage for this system is that it would be nearly impervious to bird strike damage. FAA records show that over 60 percent of bird strike accidents have been within 100 feet of the ground. The system described here allows passengers to be lifted slowly up to several thousand feet above ground prior to high speed horizontal travel. In other words, high speed travel can be carried out at an altitude such that bird caused damage is extremely unlikely.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method of lifting a cargo container into flight, using a plurality of aircraft, said method comprising the steps of:
   providing a swivel bearing having a first end and a second end that are free to rotate independently;
   providing a streamlined cargo container;
   attaching said second end of said swivel bearing to said streamlined cargo container;
   providing the plurality of aircraft in flight, wherein tow tether lines extend from said plurality of aircraft;
   attaching said tow tether lines to said first end of said swivel bearing; and
   flying said aircraft in an ascending circular pattern, therein applying lift to said cargo container sufficient to raise said cargo container into flight.

2. The method according to claim 1, wherein said step of attaching said second end of said swivel bearing to said streamlined cargo container includes attaching cargo tether lines between said swivel bearing and said cargo container.

3. The method according to claim 2, further including the step of providing winches anchored to said streamlined cargo container.

4. The method according to claim 3, wherein said cargo tether lines are attached to said winches.

5. The method according to claim 4, further including the step of selectively adjusting said cargo tether lines using said winches to stabilize said streamlined cargo container during flight and provide pitch angle control.

6. The method according to claim 1, wherein said step of providing a streamlined cargo container includes providing a streamlined cargo container with wings having control surfaces.

7. The method according to claim 1, wherein said step of providing a streamlined cargo container includes providing a streamlined cargo container with a vertical stabilizer having control surfaces.

8. The method according to claim 7, wherein said control surfaces include an adjustable rudder.

9. The method according to claim 1, wherein said step of providing a streamlined cargo container includes providing a streamlined cargo container with a horizontal stabilizer having control surfaces.

10. The method according to claim 1, wherein said step of providing a streamlined cargo container includes providing a cargo container with a motor powered propeller.

11. A method of towing a cargo container in flight, using a plurality of aircraft, said method comprising the steps of:

providing a swivel bearing having a first end and a second end that are free to rotate independently;

attaching said first end of said swivel bearing to said plurality of aircraft using a first set of flexible tether lines;

attaching said second end of said swivel bearing to said cargo container using a second set of flexible tether lines;

providing flight controls on said cargo container; and operating said flight controls to stabilize said cargo container while in flight.

12. The method according to claim 11, further including the step of selectively lengthening and shortening said second set of tether lines to maintain said cargo container in a desired orientation during flight.

13. The method according to claim 12, further including the step of providing mechanisms for lengthening and shortening said second set of tether lines.

14. The method according to claim 11, wherein said step of providing flight controls includes providing wings with control surfaces on said cargo container.

15. The method according to claim 11, wherein said step of providing flight controls includes providing a stabilizing tail with control surfaces.

* * * * *